| United States Patent [19] | [11] Patent Number: 4,798,864 |
| Topcik | [45] Date of Patent: Jan. 17, 1989 |

[54] ELASTOMER POLYOLEFIN BLENDS

[75] Inventor: Barry Topcik, Bridgewater, N.J.

[73] Assignee: Union Carbide Corporation, Danbury, Conn.

[21] Appl. No.: 105,233

[22] Filed: Oct. 7, 1987

Related U.S. Application Data

[63] Continuation of Ser. No. 874,450, Jun. 16, 1986, abandoned.

[51] Int. Cl.$^4$ .................. C08L 51/06; C08L 23/26
[52] U.S. Cl. ..................................... 525/71; 525/72; 525/96; 525/209
[58] Field of Search ............... 525/71, 72, 96, 209

[56] References Cited

U.S. PATENT DOCUMENTS 4,618,654 10/1986 Schmidtchen et al. ............... 525/72

FOREIGN PATENT DOCUMENTS 0023651 2/1982 Japan ..................................... 525/71

*Primary Examiner*—Wilbert J. Briggs, Sr.
*Attorney, Agent, or Firm*—Saul R. Bresch

[57] ABSTRACT

An elastomer blend comprising:
(a) a polyolefin selected from the group consisting of (i) polyethylene; (ii) a hydrolyzable copolymer of ethylene and silane; and (iii) a hydrolyzable silane modified polyethylene; and
(b) an ethylene-propylene-diene terpolymer rubber, with or without silane modification, said terpolymer when silane modified being hydrolyzable, provided that, when component (a) is polyethylene, the terpolymer is silane modified, the blend of components (a) and (b) having the following physical properties:
(i) Secant Modulus in the range of about 100 psi to about 10,000 psi;
(ii) 100% Modulus in the range of about 100 psi to about 1500 psi; and
(iii) Shore A hardness in the range of about 10 to about 100.

9 Claims, No Drawings

ELASTOMER POLYOLEFIN BLENDS

This application is a continuation of prior U.S. application Ser. No. 874,450, filing date June 16, 1986, now abandoned.

TECHNICAL FIELD

This invention relates to elastomer polyolefin blends, which are curable by exposure to water.

BACKGROUND ART

Cured rubber is useful in hose and tubing, liners, wire and cable insulation, mats, and molded items such as shoe soles, toys, kitchen ware, seals, and automotive parts. These applications generally require superior tensile strength, flex modulus, resilience, elongation, hardness, oil resistance, and/or electrical resistivity. In certain applications, service at high temperatures, i.e., at about 250° F., is required.

Processes for providing the cured rubber using various curing or vulcanizing agents such as perioxides, azides, aldehyde/amine reaction products, sulfur, sulfur bearing accelerators, and dimethylol phenolic resins are well known.

The art is continuously striving to find substitutes for cured or vulcanized rubber, which have comparable physical properties, particularly high temperature service capability, but lower processing costs.

DISCLOSURE OF INVENTION

An object of this invention, therefore, is to provide a composition, which, when cured, possesses physical properties substantially equivalent to cured or vulcanized rubber and can be processed more economically.

Other objects and advantages will become apparent hereinafter.

According to the present invention, the above object is met by a polyolefin blend, which, on contact with water, cures to a cured rubber equivalent. The blend comprises:

(a) a polyolefin selected from the group consisting of (i) polyethylene; (ii) a hydrolyzable copolymer of ethylene and silane; and (iii) a hydrolyzable silane modified polyethylene; and (b) an ethylene-propylene-diene terpolymer rubber, with or without silane modification, said terpolymer when silane modified being hydrolyzable, provided that, when component (a) is polyethylene, the terpolymer is silane modified, said blend having the following physical properties:
(i) Secant Modulus in the range of about 100 psi to about 10,000 psi;
(ii) 100% Modulus in the range of about 100 psi to about 1500 psi; and
(iii) Shore A hardness in the range of about 10 to about 100.

DETAILED DESCRIPTION

The copolymer of ethylene or propylene and silane can be prepared by the process described in U.S. Pat. No. 3,225,018, which is incorporated by reference herein. The silane is present in the range of about 0.5 to about 10 percent by weight based on the weight of the copolymer and is preferably in the range of about 0.5 to about 4 percent by weight.

The silane modified polyethylene or polypropylene can be prepared by the technique described in examples II and III below. In this polymer, as for the copolymer above, the silane is present in an amount of about 0.5 percent to about 10 percent by weight based on the weight of the silane modified polymer and is preferably incorporated into the polymer in an amount of about 0.5 to about 4 percent by weight.

The silane grafted copolymer of ethylene and vinyl acetate can be prepared by the processes described in U.S. Pat. Nos. 3,646,155 and 3,697,551, incorporated by reference herein. The vinyl acetate is present in the copolymer in an amount of about 5 percent to about 45 percent by weight based on the weight of the copolymer exclusive of the silane and the silane is present in the same amounts set forth above for the silane containing copolymer and polymer based on the weight of the silane grafted copolymer.

The silane grafted copolymer of ethylene and ethyl acrylate can be prepared in accordance with the process disclosed in U.S. Pat. No. 4,291,136, incorporated by reference herein. The ethyl acrylate is present in the copolymer in an amount of about 5 to about 40 percent by weight based on the weight of the copolymer exclusive of the silane. Again, the silane is present in the same amounts as those set forth above based on the weight of the silane grafted copolymer.

The ethylene-propylene-diene terpolymer rubber without the silane modification can be prepared as described in U.S. Pat. No. 3,835,201, which is incorporated by reference herein. The terpolymer rubber with the silane modification can be prepared by the process described in example I below. The broad and preferred ranges of terpolymer rubber components in percent by weight based on the weight of the terpolymer rubber are about as follows:

| Component | Broad | Preferred |
|---|---|---|
| ethylene | 30 to 85 | 65 to 75 |
| propylene | 15 to 70 | 20 to 40 |
| diene | 1 to 10 | 2 to 8 |
| silane | 0 to 10 | 0 to 7 |

The diene can be a conjugated or non-conjugated diene containing 5 to 25 carbon atoms such as 1,4-pentadiene, 1,4-hexadiene, 1,5-hexadiene, dicyclopentadiene, cyclohexadiene, 1-vinyl-1-cyclopentene, and the alkylbicyclononadienes, idenes, and norbornenes. Ethylidene norbornene is an example of the latter. The non-conjugated dienes are preferred.

The blends are prepared by mixing the polyolefin and terpolymer rubber at a temperature in the range of about 70° C. to about 200° C. The preferred temperature is in the range of about 110° C. to about 160° C. Additives, which are mentioned below, can be added initially or after the polyolefin and terpolymer rubber have been thoroughly mixed.

The silane copolymer, the silane modified polyolefin, and the silane modified terpolymer rubber can be crosslinked by exposing the polymer to moisture i.e., the silane is such that it makes the polymer hydrolyzable. The crosslinking is accelerated in the presence of an appropriate silanol condensation catalyst such as dibutyl tin dilaurate, dioctyl tin maleate, stannous acetate, stannous octoate, lead naphthenate, zinc octoate, iron 2-ethyl hexoate, and other metal carboxylates. If crosslinking of a terpolymer rubber, which is not silane modified, is desired, conventional vulcanizing agents such as sulfur and sulfur-bearing accelerators can be introduced. Sulfur-bearing accelerators, which are usually added in combination with the sulfur, include benzothiazyl disulfide and tetramethylthiruam monosulfide. This crosslinking can be effected during the high temperature mixing step, which is usually carried out in the absence of moisture, moisture being unnecessary for vulcanization. Advantages, both physical and process-wise, are obtained whether or not the terpolymer rubber is crosslinked. Moisture induced crosslinking is not reversible, which simply means that the cured blend will not become soft at elevated temperatures, a deficiency of thermoplastics, after oits exposure to moisture. Where both the polyolefin and the terpolymer rubber contain silane by copolymerization or modification, the blend will be fully crosslinked on contact with water whereas if only one of the polymers contain silane, the blend will be partially crosslinked. As noted, advantages are obtained under both conditions.

The blend of polyolefin and terpolymer rubber comprises about 5 percent to about 95 percent by weight polyolefin and about 5 percent to about 95 percent by weight terpolymer based on the weight of the blend. A preferred blend contains about 20 percent to about 80 percent polyolefin and about 20 percent to about 80 percent terpolymer. The softer compositions contain about 60 to about 80 percent by weight terpolymer rubber whereas the harder compositions contain about 50 to about 90 percent polyolefin. The latter blends inherently provide greater strength properties when cured.

Subject blends can contain fillers such as carbon black, precipitated silica, clay, and calcium carbonate; plasticizers such as ester plasticizers and paraffin wax; extender oils exemplified by paraffin and naphthenic oils, and various other components conventionally used in compounding olefins and rubbers such as lubricants, ultraviolet stabilizers, dyes, colorants, processing aids, antioxidants, smoke inhibitors, and flame retardants.

The blends are usually extruded into pellets and then injection molded or extruded into the desired shape. Pellets of a masterbatch based, for example, on polyethylene as a carrier polymer containing a silanol condensation catalyst such as dibutyl tin dilaurate are mixed with the blend pellets just before molding or extrusion. This technique is used to keep the catalyst separated from the silane containing polymer prior to processing. Otherwise, the silane containing polymer will cure prematurely. The concentration of catalyst in the masterbatch is such to provide about 0.05 to about 1.0 percent by weight of catalyst based on the weight of the silane containing polymers in the blend. The product exiting the mold is immersed in hot water, i.e., water having a temperature in the range of about 40° C. to about 90° C. This technique eliminates 3 or 4 labor intensive steps used in curing rubber, an obvious economic advantage.

The blend can be water cured during the mixing step by adding water releasing materials such as p,p'-oxybis benzene sulfonyl hydrazide, hydrated zinc borate, and hydrated magnesium sulfate. In this case, a catalyst, such as the metal carboxylates mentioned above, is added to the blend prior to mixing along with a co-catalyst exemplified by tetramethoxy titanate, tetraisopropyl titanate, tetramethyl titanate, and other organo titanates mentioned in U.S. Pat. No. 4,446,279, which is incorporated by reference herein. At temperatures in the range of about 100° C. to about 170° C., the water releasing materials release about 5 to about 55 percent water.

Subject blends are distinctive in their rubbery quality from, for example, a high density polyethylene with 20 percent by weight ethylene-propylene-dience terpolymer rubber in that the Secant Modulus of the polyethylene/terpolymer rubber is about 75,000 psi as against about 100 to about 10,000 psi for subject blends.

In this vein, subject blends can be characterized by the following physical properties:

| Property | Range (about) Broad | Preferred |
|---|---|---|
| Secant Modulus (psi) | 100 to 10,000 | 250 to 8500 |
| 100% Modulus (psi) | 100 to 1500 | 250 to 1000 |
| Shore A hardness | 10 to 100 | 30 to 85 |

Properties within these ranges can be achieved by varying the amount of blend components within the broad and preferred ranges prescribed therefor.

The invention is illustrated by the following examples. Parts and percentages are by weight.

EXAMPLE I

The formulation and procedure for preparing a silane modified terpolymer rubber is described.

The terpolymer rubber is made up of 70 percent ethylene, 30 percent propylene, and sufficient ethylidene norbornene to provide about 3 to about 5 percent unsaturation in the terpolymer rubber.

100 parts of terpolymer rubber, 3 parts of vinyltriisobutoxysilane, 0.075 parts of an antioxidant, polymerized 1,2-dihydro-2,2,4-trimethylquinoline and 0.05 parts of dicumyl peroxide are masterbatched at about 110° C., which is below the decomposition temperature of dicumyl peroxide. Grafting is effected in a Banbury mixer by mixing for 5 minutes at 185° C. It can also be carried out, e.g., in a Brabender mixer or on a two roll mill.

103.125 parts of silane grafted terpolymer rubber are mixed with 0.5 parts of dibutyl tin dilaurate in a Brabender mixer at 160° C. to provide sample A.

The same procedure is followed for sample B except that 3 parts of tetramethoxy titanate are added to the mix.

Both samples are immersed in water for 16 hours at 70° C.

A rheometer test is carried out at 182° C. for each sample at 3 stages of the procedure. The rheometer numbers are as follows:

| | Stage | Sample A | Sample B |
|---|---|---|---|
| 1. | neat terpolymer rubber | 18 | 18 |
| 2. | after silane grafting | 18 | 28* |
| 3. | after water immersion | 30 | 48 |

*some water cure occurs during molding and handling due to absorption of ambient water vapor

EXAMPLE II

The formulation and procedure for preparing a silane modified polyethylene is described.

The polyethylene used in this example is a low density polyethylene having a density of 0.90 and a melt index of 1.0. The low density polyethylene can be made by the process described in European Patent Application No. 1 120 503, incorporated by reference herein, wherein ethylene is polymerized together with an alpha olefin comonomer having 3 to 8 carbon atoms or by other conventional techniques. In the present application, low density polyethylenes are considered to include copolymers of etylene and a minor proportion of alpha-olefin.

100 parts of polyethylene, 0.2 part of polymerized 1,2-dihydro-2,2,4-trimethylquinoline (an antioxidant), 0.1 part of dicumyl peroxide, and 4 parts of vinyl tri-2-ethylhexoxy silane are mixed in a laboratory Brabender mixer, a Banbury mixer, or on a 2 roll mill at a temperature in the range of about 80° C. to about 115° C., a temperatures low enough to keep the dicumyl peroxide below its decomposition temperature.

After mixing for five minutes, the temperature is raised to a temperature in the range of about 150° C. to about 200° C. The batch is then mixed for 5 to 10 minutes during which grafting of the silane to the polyethylene occurs.

The antioxidant is used as a radical trap to control the amount of crosslinking.

The silane grafted polyethylene is tested for reactivity as follows: 104.3 parts of silane grafted polyethylene is mixed with 0.5 part of dibutyl tin dilaurate or dioctyl tin maleate for five minutes at about 160° C.

A test slab, three inches by seven inches by 0.075 inch thick, is compression molded at about 150° C. from the mixture and then cooled in the mold.

The slab is tested immediately in a rheometer at 182° C. The torque reading is 8 to 10 units. The slab is then placed in water at 70° C. for 48 hours and tested, once more, in a rheometer at 182° C. The torque reading is 40 to 50 units. This indicates that water crosslinking has occurred. The increase in torque units indicates the degree of crosslinking.

EXAMPLE III

Example II is repeated except that 3 parts of vinyl-triisobutoxysilane and 0.1 part of the antioxidant, tetrakis [methylene (3-5-di-tert-butyl-4-hydroxyhydro-cinnamate] methane are used; initial mixing is in the range of 110° C. to 120° C.; grafting is for 5 minutes at 185° C.; first rheometer test is at 182° C. with same result; slab is immersed in water for 16 hours; and second torque reading is 40 units.

EXAMPLE V (SAMPLES 1 TO 3)

Ethylene silane copolymer containing about 0.5 to about 3 percent by weight silane is first mixed with neat terpolymer rubber or silane grafted terpolymer rubber (see Example I for compositions) in a Brabender mixer at 150° C. The catalyst is then added and mixed. Part of each sample is molded into a test slab at 180° C. The slabs are immersed in water for 64 hours at 70° C. and then used to determine the properties. The balance of samples 2 and 3 is also immersed in water for 64 hours at 70° C. The unmolded portion of samples 1, 2, and 3 is used to determine viscosity. Viscosities are measured in a rheometer at 182° C.

Compositions, viscosities, and properties are as follows:

|  | Samples | | |
| --- | --- | --- | --- |
|  | 1 | 2 | 3 |
|  | | (parts) | |
| Components | | | |
| ethylene silane copolymer | 60 | 60 | 60 |
| terpolymer rubber | 40 | 40 | — |
| silane grafted terpolymer rubber | — | — | 40 |

| -continued | | | |
| --- | --- | --- | --- |
|  | Samples | | |
|  | 1 | 2 | 3 |
|  | | (parts) | |
| dioctyl tin maleate | — | 0.05 | 0.05 |
| Viscosity | (rheometer number) | | |
| before water immersion | 11 | 14 | 16 |
| after water immersion | — | 35 | 38 |
| Properties | | | |
| 100% Modulus, psi | 755 | 890 | 880 |
| 300% Modulus, psi | 815 | 1240 | 1190 |
| tensile strength, psi | 2350 | 1530 | 2210 |
| percent elongation | 800 | 380 | 430 |
| Shore A hardness | 90 | 92 | 92 |

The tests used to determine the properties are set forth under ASTM D-412.

EXAMPLE V (SAMPLES 4 TO 6)

Example IV is repeated except that neat terpolymer rubber is not used and, instead of just a catalyst, a catalyst and an antioxidant are added and mixed.

It is noted that the compositions contain two crosslinked polymer phases intertwined between ethylene silane chains.

Compositions and properties are as follows:

|  | Samples | | |
| --- | --- | --- | --- |
|  | 4 | 5 | 6 |
|  | | (parts) | |
| Components | | | |
| ethylene silane copolymer | 0 | 30 | 20 |
| silane grafted terpolymer rubber | 60 | 70 | 80 |
| tetrakis [methylene (3-5-di-tert-butyl-4-hydroxyhydro-cinnamate] methane | 0.25 | 0.25 | 0.25 |
| dibutyl tin dilaurate | 0.25 | 0.05 | 0.25 |
| Properties | | | |
| 100% Modulus, psi | 840 | 690 | 560 |
| 300% Modulus, psi | 1470 | 1180 | 940 |
| tensile strength, psi | 1620 | 1440 | 1280 |
| percent elongation | 320 | 410 | 485 |
| Shore A hardness | 82 | 77 | 73 |

EXAMPLE VI (SAMPLES 7 TO 10)

Example IV is repeated except that a silane modified low density polyethylene prepared as in Examples II or III is substituted for the ethylene silane copolymer. The polyethylene contains 3 to 4 percent by weight silane and has a density of 0.91. Water immersion is for 16 hours.

Compositions, viscosities, and properties are as follows:

|  | Samples | | | |
| --- | --- | --- | --- | --- |
|  | 7 | 8 | 9 | 10 |
|  | | (parts) | | |
| Components | | | | |
| silane modified polyethylene | 50 | 40 | 50 | 40 |
| neat terpolymer rubber | 50 | 60 | — | — |
| silane modified terpolymer rubber | — | — | 50 | 60 |
| dibutyl tin dilaurate | 0.125 | 0.1 | 0.25 | 0.25 |
| Viscosity | (rheometer number) | | | |
| before water immersion | 17 | 17 | 19 | 17 |
| after water immersion | 25 | 25 | 30 | 31 |
| Properties | | | | |
| Secant Modulus, psi | 4830 | 4180 | 5030 | 3830 |
| 100% Modulus, psi | 500 | 455 | 630 | 515 |
| 300% Modulus, psi | 605 | 560 | 795 | 655 |

-continued

|  | Samples | | | |
| --- | --- | --- | --- | --- |
|  | 7 | 8 | 9 | 10 |
|  | (parts) | | | |
| tensile strength, psi | 2700 | 2080 | 2400 | 2250 |
| percent elongation | 910 | 960 | 795 | 845 |
| Shore A hardness | 84 | 84 | 85 | 82 |

The test used in determining Secant Modulus is ASTM D-638.

EXAMPLE VII (SAMPLES 11 TO 16)

The objective is to develop a cured terpolymer rubber in a low density polyethylene matrix. The polyethylene has a density of 0.90. The silane grafted terpolymer rubber is the same as in Example I. The components are masterbatched at 120° C. in a Brabender mixer. When all of the components are incorporated, the temperature is raised to 180° C. and the components permitted to react for 5 minutes. The hydrazide releases 9 percent water based on the weight of the hydrazide.

Compositions and properties are as follows:

|  | Samples | | | | | |
| --- | --- | --- | --- | --- | --- | --- |
|  | 11 | 12 | 13 | 14 | 15 | 16 |
|  | (parts) | | | | | |
| Components | | | | | | |
| polyethylene | 50 | 40 | 30 | 20 | 30 | 20 |
| silane grafted terpolymer rubber | 50 | 60 | 70 | 80 | 70 | 80 |
| tetrakis [methylene (3,5-di-tert-butyl-4-hydroxyhydrocinnamate] methane | 0.25 | 0.25 | 0.25 | 0.25 | 0.25 | 0.25 |
| tetramethoxy titanate | 1.5 | 1.5 | 1.5 | 1.5 | 1.5 | 1.5 |
| dibutyl tin dilaurate | 0.04 | 0.04 | 0.04 | 0.04 | 0.04 | 0.04 |
| p,p'-oxybis benzene sulfonyl hydrazide | 2 | 2 | 2 | 2 | 2 | 2 |
| precipitated silica | — | — | — | — | 20 | 20 |
| paraffinic oil | — | — | — | — | 5 | 5 |
| Properties | | | | | | |
| 100% Modulus, psi | 520 | 480 | 425 | 365 | 545 | 490 |
| 300% Modulus, psi | 650 | 645 | 570 | 595 | 760 | 790 |
| tensile strength, psi | 1950 | 1720 | 1470 | 1680 | 1495 | 1315 |
| percent elongation | 925 | 920 | 970 | 920 | 790 | 695 |
| Shore A hardness | 85 | 82 | 78 | 74 | 82 | 80 |

EXAMPLE VII (SAMPLES 17 TO 19)

Example VII is repeated except that a styrene-ethylene-butylene-styrene copolymer is included in the composition. The copolymer contains 33 percent styrene and 67 percent ethylene/butylene.

Compositions and properties are as follows:

|  | Samples | | |
| --- | --- | --- | --- |
|  | 17 | 18 | 19 |
|  | (parts) | | |
| Components | | | |
| polyethylene | 40 | 30 | 20 |
| silane grafted terpolymer rubber | 30 | 40 | 50 |
| styrere-ethylene-butylene-styrene copolymer | 30 | 30 | 30 |
| tetrakis [methylene (3-5-di-tert-butyl-4-hydroxyhydro-cinnamate] methane | 0.25 | 0.25 | 0.25 |
| tetramethoxy titanate | 1.5 | 1.5 | 1.5 |
| dibutyl tin dilaurate | 0.04 | 0.04 | 0.04 |
| p,p'-oxybis benzene sulfonyl hydrazide | 2 | 2 | 2 |
| Properties | | | |
| 100% Modulus, psi | 20 | 375 | 335 |
| 300% Modulus, psi | 600 | 555 | 545 |
| tensile strength, psi | 2260 | 1560 | 1300 |

-continued

|  | Samples | | |
| --- | --- | --- | --- |
|  | 17 | 18 | 19 |
|  | (parts) | | |
| percent elongation | 895 | 870 | 795 |
| Shore A hardness | 75 | 70 | 67 |

I claim:

1. An elastomer blend consisting essentially of:
   (a) a polyolefin selected from the group consisting of (i) polyethylene; (ii) a hydrolyzable copolymer of ethylene and silane; and (iii) a hydrolyzable silane modified polyethylene; and
   (b) an ethylene-propylene-diene terpolymer rubber, with or without silane modification, said terpolymer when silane modified being hydrolyzable, provided that, when component (a) is polyethylene, the terpolymer is silane modified,
   the blend of components (a) and (b) containing no more than about 40 percent by weight of component (a) based on the combined weight of components (a) and (b) and having the following properties:
   (i) Secant Modulus in the range of about 100 psi to about 10,000 psi;
   (ii) 100% Modulus in the range of about 100 psi to about 1500 psi; and
   (iii) Shore A hardness in the range of about 10 to about 100.

2. The blend defined in claim 1 wherein the silane in the polyolefin is present in an amount of about 0.5 percent to about 4 percent by weight based on the weight of the polyolefin; the terpolymer rubber contains about 65 to about 75 percent by weight ethylene, about 20 to about 40 percent by weight propylene, about 2 to about 8 percent by weight diene, and 0 to about 7 percent by weight silane, all percentages based on the weight of the terpolymer rubber; and the blend has the following physical properties:
   (i) Secant Modulus in the range of about 250 to 8500 psi;
   (ii) 100% Modulus in the range of about 250 to 1000 psi; and
   (iii) Shore A hardness in the range of about 30 to 85.

3. The blend defined in claim 1 in combination with at least one catalyst compound, which will accelerate the cure of the blend in the presence of water.

4. The blend defined in claim 2 in combination with at least one catalyst compound, which will accelerate the cure of the blend in the presence of water.

5. The blend defined in claim 3 in further combination with a water releasing compound.

6. The blend defined in claim 4 in further combination with a water releasing compound.

7. The blend defined in claim 6 wherein compount (a) is a copolymer of ethylene and silane or a silane modified polyethylene.

8. The blend defined in claim 5 wherein component (a) is polyethylene.

9. An elastomer blend consisting essentially of:
(a) a polyolefin selected from the group consisting of (i) polyethylene; (ii) a hydrolyzable copolymer of ethylene and silane; and (iii) a hydrolyzable silane modified polyethylene;
(b) an ethylene-propylene-diene terpolymer rubber, with or without silane modification, said terpolymer when silane modified being hydrolyzable, provided that, when component (a) is polyethylene, the terpolymer is silane modified; and
(c) a styrene-ethylene-butylene-styrene copolymer, the combination of components (a) and (b) containing no more than about 40 percent by weight of component (a) based on the combined weight of components (a) and (b) and the blend of components (a), (b), and (c) having the following properties:
(i) Secant Modulus in the range of about 100 psi to about 10,000 psi;
(ii) 100% Modulus in the range of about 100 psi to about 1500 psi; and
(iii) Shore A hardness in the range of about 10 to about 100.

* * * * *